United States Patent
Donhowe et al.

(10) Patent No.: US 10,004,125 B2
(45) Date of Patent: Jun. 19, 2018

(54) AUTOMATICALLY ADJUST SENSOR SAMPLE RATES AND MODES BASED ON SENSOR FEEDBACK AND SYSTEM STATE

(71) Applicant: Google Inc., Mountain View, CA (US)

(72) Inventors: Kristoffer John Donhowe, Mountain View, CA (US); Yash Modi, San Mateo, CA (US); Douglas John Thomas, Santa Cruz, CA (US); Shao-Po Ma, Taipei (TW)

(73) Assignee: Google LLC, Mountian View, CA (US)

( * ) Notice: Subject to any disclaimer, the term of this patent is extended or adjusted under 35 U.S.C. 154(b) by 127 days.

(21) Appl. No.: 14/719,942

(22) Filed: May 22, 2015

(65) Prior Publication Data
US 2016/0345406 A1 Nov. 24, 2016

(51) Int. Cl.
*H05B 33/08* (2006.01)
*H05B 37/02* (2006.01)

(52) U.S. Cl.
CPC ..... *H05B 37/0227* (2013.01); *H05B 37/0218* (2013.01); *H05B 37/0245* (2013.01); *Y02B 20/46* (2013.01)

(58) Field of Classification Search
None
See application file for complete search history.

(56) References Cited

U.S. PATENT DOCUMENTS

| | | | | |
|---|---|---|---|---|
| 5,748,303 A * | 5/1998 | Korta | ......................... | G01J 1/46 250/214 R |
| 6,618,083 B1 * | 9/2003 | Chen | ...................... | H04N 5/363 348/243 |
| 6,791,458 B2 * | 9/2004 | Baldwin | .................. | G01S 13/04 340/521 |
| 7,916,018 B2 * | 3/2011 | Eskildsen | .............. | G08B 13/08 340/506 |
| 8,195,313 B1 * | 6/2012 | Fadell | .................. | F24F 11/0009 236/1 C |
| 8,373,355 B2 * | 2/2013 | Hoover | .............. | H05B 33/0845 315/291 |
| 8,431,899 B2 * | 4/2013 | Tatsuoka | .............. | G08B 13/191 250/338.1 |
| 8,531,294 B2 * | 9/2013 | Slavin | ................ | G08B 13/2402 340/539.13 |
| 8,552,664 B2 | 10/2013 | Chemel et al. | | |

(Continued)

OTHER PUBLICATIONS

Miyagawa et al., Integration-Time Based Computational Image Sensors, ITE Technical Report vol. 19, No. 65, pp. 37-41, 1995.*

(Continued)

*Primary Examiner* — Dedei K Hammond
(74) *Attorney, Agent, or Firm* — Morris & Kamlay LLP

(57) ABSTRACT

A path light control device that can include a processor and light source, and any combination of ambient light sensors (ALS), passive infrared (PIR) sensors, accelerometers and compass sensors, where the sensor sampling mode and sampling period may be dynamically determined to permit the ALS to accurately measure an ambient light without excessive operation. The accelerometer and compass sensor may be provided to determine device movement and orientation to avoid sensor operation when movement or orientation of the device indicates that the data of the sensor is not applicable for proper device control.

25 Claims, 5 Drawing Sheets

(56) References Cited

U.S. PATENT DOCUMENTS

| | | | |
|---|---|---|---|
| 8,692,683 B2 | 4/2014 | Dove et al. | |
| 8,760,293 B2* | 6/2014 | Steiner | G01J 1/02 250/205 |
| 8,780,201 B1* | 7/2014 | Scalisi | H04N 7/186 348/143 |
| 8,866,392 B2* | 10/2014 | Chen | H05B 39/042 315/152 |
| 8,941,308 B2* | 1/2015 | Briggs | H05B 37/0218 315/149 |
| 8,949,639 B2* | 2/2015 | Kamhi | G06F 1/3287 713/300 |
| 8,987,652 B2* | 3/2015 | Zheng | G09G 3/3406 250/214 AL |
| 9,080,758 B2* | 7/2015 | Igaki | H05B 33/0854 |
| 9,134,172 B2* | 9/2015 | Chua | G01J 1/4204 |
| 9,332,616 B1* | 5/2016 | Modi | H05B 37/0281 |
| 9,661,221 B2* | 5/2017 | Sadasivam | H04N 5/23245 |
| 2012/0013476 A1 | 1/2012 | Dove et al. | |
| 2012/0068686 A1 | 3/2012 | Steiner et al. | |
| 2012/0235579 A1 | 9/2012 | Chemel et al. | |
| 2013/0187568 A1 | 7/2013 | Jelaca et al. | |
| 2013/0307424 A1 | 11/2013 | Gray et al. | |
| 2014/0267799 A1* | 9/2014 | Sadasivam | H04N 5/23216 348/207.99 |
| 2014/0379305 A1* | 12/2014 | Kumar | G01V 11/00 702/190 |

OTHER PUBLICATIONS

Miyagawa et al., Integration-Time Based Computational Image Sensors, ITE Technical Report vol. 19, No. 65, pp. 37-41, 1995. Ryohei Miyagawa, Toshiba R&D, Takeo Kanade, CMU.*

* cited by examiner

AUTOMATICALLY ADJUST SENSOR SAMPLE RATES AND MODES BASED ON SENSOR FEEDBACK AND SYSTEM STATE

BACKGROUND

A "path light" generally refers to a light source that illuminates a pathway. By comparison, a room light illuminates, for example, an entire room including any included pathways. Path lights provide more targeted illumination and are typically utilized to illuminate a sidewalk or other path on the exterior of a home, or a particular path or hallway on the interior of the home, especially those that may not be properly or efficiently illuminated by room lights. In a commercial setting, such as a movie theater, a path light can be utilized to illuminate stairways, corridors or other paths to direct consumers to their seats or to exits, and can include a variety of lighting sources, controls and sensors, such as ambient light sensors, to ensure that the path light illuminates only in dark conditions.

However, since many of the path light control devices are battery powered, each has to consider how frequently power is used to sample the associated environmental sensors, such as ambient light sensors (ALS), which can consume large amounts of power. At the same time, the control device needs to react quickly to various events such as a moving presence in the path light environment or the switching on and off of other light sources in the area, so it cannot sample the sensors too infrequently.

Accordingly, in some situations, the path light may not respond in an optimal manner to the detected user presence and ambient light conditions. For example, the path light may operate using a single sampling mode or sampling period which can be inefficient when conditions indicate another sampling mode or sampling period may perform better. In cases where the path light can operate using multiple sampling modes or sampling periods, the transition between each may not be designed to balance user comfort, energy efficiency, sensor position and proper system function.

BRIEF SUMMARY

According to implementations of the disclosed subject matter, a system and method is provided for automatic system control in which "sleepy" or slow sensor sampling states can be changed to "active" or faster sampling states, or combinations thereof, based on feedback from sensors and other changes in the state of the device to balance user comfort, energy efficiency and proper system function. According to one implementation of the disclosed subject matter, a system and method is provided for automatic path light illumination control that can operate using multiple sampling modes and sampling periods, and where the transition between each is designed to balance user comfort, energy efficiency, sensor position and proper system function.

To do so, an implementation of the disclosed subject matter provides one or more ambient light sensors (ALS), passive infrared (PIR) sensors, accelerometers, compass sensors or other means, that can obtain a corresponding type of information or metrics about the environment in which the sensors are located.

An implementation of the disclosed subject matter also provides a processor or other means that can determine an environmental state based on the detected information or metrics about the environment in which the sensor is located.

An implementation of the disclosed subject matter also provides the processor or other means to drive an ALS sampling function to dynamically determine an optimal sampling mode and sampling period based on the determined environmental state.

An implementation of the disclosed subject matter also provides the processor or other means to control a path light source based on sensor data obtained at the determined sensor sampling mode and sensor sampling period.

An implementation of the disclosed subject matter also provides the processor or other means to determine motion and directional orientation of the sensor and determine a degree of sensor function in such directional orientation or during such motion, and disable sensor operation when the detected movement or orientation indicates that the data of the sensor is not applicable for proper device control.

Accordingly, implementations of the disclosed subject matter provides means for automatic path light illumination control that can operate using multiple sampling modes and sampling periods, and that can transition between each mode and period in a manner that considers user comfort, energy efficiency, sensor position and proper system function.

Implementations of the disclosed subject matter also provide a system and method for automatic path light illumination control that can control periods of sensor operation, including an ALS sensor, by switching between sampling modes and sampling periods depending upon an analysis of environmental data including ambient light levels, occupancy detection and sensor position and movement. The path light control device can include a processor and light source, and any combination of ALS, PIR, accelerometer and compass sensors, where the sampling mode and sampling period can be determined to permit the ALS to accurately measure an ambient light without excessive operation. The accelerometer and compass sensor can be provided to determine device movement and directional orientation to avoid sensor operation when the movement or orientation of the device indicates that the data of the sensor is not applicable for proper device control.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of the disclosed subject matter. No attempt is made to show structural details in more detail than may be necessary for a fundamental understanding of the disclosed subject matter and various ways in which it may be practiced.

DETAILED DESCRIPTION

Figure 1:
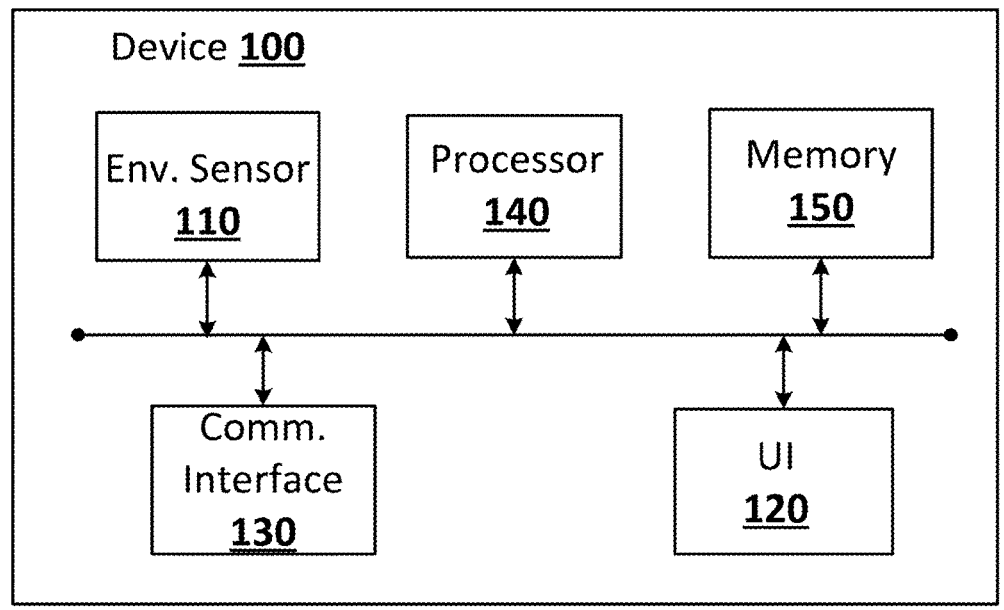
FIG. 1 shows an illustrative device for incorporating one or more of an ambient light sensor (ALS), passive infrared (PIR) sensor, accelerometer, compass sensor and function-executing processor according to an implementation of the disclosed subject matter.

Implementations of the disclosed subject matter enable automatic system control in which "sleepy" or slow sensor sampling states can be changed to "active" or faster sampling states, or combinations thereof, based on feedback from sensors and other changes in the state of the device to balance user comfort, energy efficiency and proper system function. One implementation of the disclosed subject matter enables automatic path light illumination control that can operate using multiple sampling modes and sampling periods, and where the transition between each mode and/or sampling period is designed to balance user comfort, energy efficiency, sensor position and proper system function. A path light control device is provided that can include a processor and light source, and any combination of ambient light sensors (ALS), passive infrared (PIR) sensors, accelerometers and compass sensors, where the sampling mode and sampling period may be determined to permit the ALS to accurately measure an ambient light without excessive operation. The accelerometer and compass sensor can be provided to determine device movement and directional orientation to disable sensor operation when the movement or orientation of the device indicates that the data of the sensor may not be applicable to proper device control.

To do so, implementations disclosed herein can use one or more sensors where, in general, a "sensor" may refer to any device that can obtain information about its environment. Sensors can be described by the type of information they collect. For example, sensor types as disclosed herein may include sound, motion, light, temperature, acceleration, proximity, physical orientation, compass, location, time, entry, presence, pressure, smoke, carbon monoxide and the like. A sensor can also be described in terms of the particular physical device that obtains the environmental information. For example, an accelerometer can obtain acceleration information, and thus may be used as a general motion sensor, vibration sensor and/or acceleration sensor. A sensor can also be described in terms of the specific hardware components used to implement the sensor. For example, a sound sensor can include a microphone and a temperature sensor can include a thermistor, thermocouple, resistance temperature detector, integrated circuit temperature detector, or combinations thereof. A sensor can also be described in terms of a function or functions the sensor performs within an integrated sensor network, such as a smart home environment as disclosed herein. For example, a sensor may operate as a security sensor when it is used to determine security events such as unauthorized entry.

Such sensors can further operate with different functions at different times, such as where a motion sensor or microphone sensor is used to control lighting in a smart home environment when an authorized user is present, and is used to provide alerts regarding unauthorized or unexpected movement or sound when no authorized user is present, or when an alarm system is in an "armed" state. In some cases, such sensors may also operate as multiple sensor types sequentially or concurrently, such as where a temperature sensor is used to detect a change in temperature as well as the presence of a person or animal. Such sensors may also operate in different modes at the same or different times. For example, a sensor may be configured to operate in one mode during the day and another mode at night. As another example, a sensor may operate in different modes based upon a state of a home security system or a smart home environment, or as otherwise directed by such a system.

A sensor as disclosed herein can also include multiple sensors or sub-sensors, such as where a position sensor includes both a global positioning sensor (GPS) as well as a wireless network sensor, which provides data that can be correlated with known wireless networks to obtain location information. Multiple sensors can be arranged in a single physical housing, such as where a single device includes sound, movement, temperature, magnetic and/or other sensors. For clarity, sensors are described with respect to the particular functions they perform and/or the particular physical hardware used when such specification is necessary for understanding. Otherwise, such sensors, sensor housings and other housing contents may be generally referred to as a "sensor", "sensor device" or simply a "device".

One such device, a "premises management device" can include hardware and software in addition to the specific physical sensor(s) that obtain information about the environment. FIG. 1 shows an illustrative premises management device as disclosed herein. The premises management device 100 can include an environmental sensor 110, user interface (UI) 120, communication interface 130, processor 140 and memory 150, but embodiments disclosed herein are not limited thereto. The environmental sensor 110 can include one or more of the sensors noted above, such as an ambient light sensor (ALS), passive infrared (PIR) sensor, accelerometer and compass sensor or any other suitable environmental sensor or combination of sensors that can obtain a corresponding type of information or metrics about the environment in which the premises management device 100 is located or if provided separately, information or metrics about the environment in which the environmental sensor 110 is located.

The processor 140 can receive and analyze data obtained by the sensor 110, control operation of the other components of the premises management device 100 and remote components such as a path light device, and process communications between the premises management device and other devices by executing instructions stored on the computer-readable memory 150, which can also store other environmental data obtained by the sensor 110. The communication interface 130, such as Wi-Fi™ or other wireless interface, Ethernet or other local network interface, or the like, is provided for communication by the premises management device 100 with other devices.

The user interface (UI) 120 is provided to communicate information and/or receive inputs from a user. The UI 120 can include, for example, a speaker to output an audible alarm when an event is detected by the premises management device 100. Alternatively, or in addition, the UI 120 can also include a light to be activated when an event is detected by the premises management device 100. The UI 120 can be relatively minimal, such as a limited-output display, or it can be a full-featured interface such as a touchscreen. In addition to the communications of the UI 120, components within the premises management device 100 can transmit and receive information to and from one another via an internal bus or other mechanism as will be readily understood by one of skill in the art.

One or more components as described above, can be implemented in a single physical arrangement, such as where multiple components are implemented on a single integrated circuit. Sensors as disclosed herein may also include other components or operational features, and/or may not include all of the illustrative components or operational features where inclusion is not required for a particular application.

Figure 2:
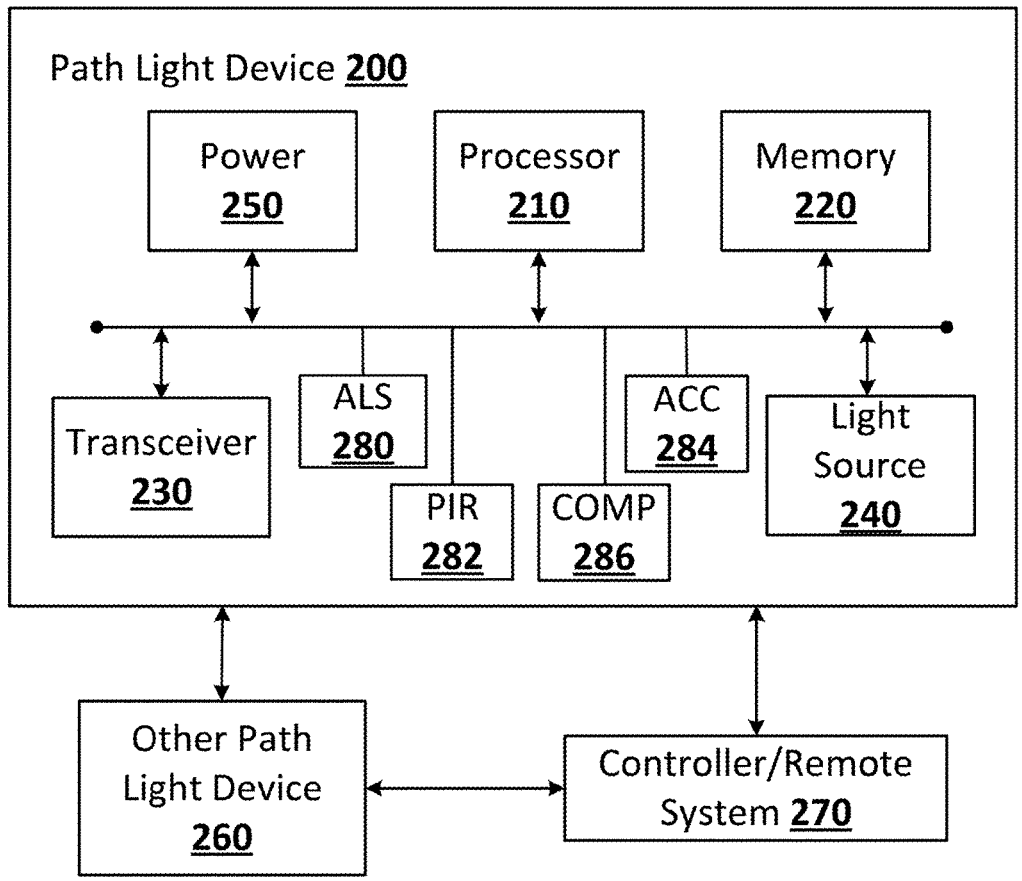
FIG. 2 shows an illustrative block diagram of a path light device according to an implementation of the disclosed subject matter.

In addition to other control and management features, the premises management device 100 can also control associated devices, such as the path light device or plurality of path light devices as shown in FIG. 2. In other implementations of the disclosed subject matter, the path light device of FIG. 2 may operate independently or share operations between devices.

As noted above, a "path light" generally refers to a light source that illuminates a pathway such as a sidewalk or other particular path on the exterior of a home or business, or a stairway, corridor or other particular path on the interior of the home or business. A path light device, as disclosed herein, may illuminate in response to a number of detected conditions and controls, such as the detection of motion and/or in response to the detection of a certain level of ambient light in the environment in and around the path area. One or more path lights may operate independently and/or as part of a smart home system that includes the premises management device 100.

An example of a path light device 200 as disclosed herein, is illustrated in FIG. 2. The path light 200 includes a processor 210, computer-readable memory 220 such as a read-only memory, transceiver 230 and variable light source 240 such as an LED or LED array, but embodiments disclosed herein are not limited thereto. The path light 200 can also include a power source such as a solar power supply, electrical connection, and/or rechargeable battery 250, but embodiments disclosed herein are not limited thereto. In some exterior applications, for example, the power source can be wired into the device through an underground or in-ground system. Further, the power source can be provided by connections with the premises management device 100.

The path light device 200 can be coupled with one or more additional path light devices 260 and/or a controller/remote system 270 including, but not limited to, the premises management device 100. The path light 200 can also include an ambient light sensor (ALS) 280, passive infrared (PIR) sensor 282, accelerometer 284 and compass sensor 286 or combination thereof, but embodiments disclosed herein are not limited thereto. In an implementation of the disclosed subject matter, the processor 210 performs control actions based on sensor data, instructions received from the controller and/or remote system 270, such as the premises management device 100, instructions or data stored in the memory 220, or combinations thereof. One or more elements of the path light device 200, such as the transceiver 230, may be omitted in some configurations where inclusion is not required for a particular application.

As depicted in FIG. 2, the transceiver 230 can include a radio, USB communication channel, or the like, and can connect the path light device 200 to a wireless network and send/receive data via the network or other communication channel. In doing so, the path light device 200 can communicate with a user and/or with one or more other path light devices 260 over the network via the transceiver 230. Each of the path lights may function independently or in some degree of cooperation with one another, where control signals can be exchanged. For example, the path lights may coordinate their activities such that if one path light device 200 detects motion and it is dark, it can signal the detected motion to other path light devices 260 and path light devices in the defined area can illuminate as needed.

In an implementation of the disclosed subject matter, the path light 200 can detect an amount of light in the proximate environment of the path light, and detect an indication that the environment of the path light is occupied (e.g., by one or more persons). For example, the ambient light sensor (ALS) 280 or other light sensor, can measure the ambient light in the environment in and around the path area. The ambient light of the path light device 200 can be observed by the ambient light sensor (ALS) 280 integrated into the path light device 200 and/or a signal may be received from an adjacent path light device and/or premises management device indicating the ambient light near the path light device 200.

The passive infrared (PIR) sensor 282 or other motion sensor, can detect the presence, movement and movement direction of a person near the path light device 200 or about to enter the field of view of the path light device 200. In this case, the field of view of the path light device 200 refers to a space that is adjacent to the path light such as, for example, a space less than 1 meter outward from an individual path light device. The field of view of the path light device 200 can be observed by the passive infrared (PIR) sensor 282 integrated into the path light device 200 and/or a signal may be received from an adjacent path light device and/or premises management device indicating the presence, movement, and movement direction of a person near the path light device 200.

The ambient light sensor (ALS) 280, passive infrared (PIR) sensor 282, accelerometer 284 and compass sensor 286 communicate data obtained by the sensors in the environment of the path light to the processor 210, controller and/or remote system 270 and/or premises management device 100 associated with the smart home. Where required to do so, the controller and/or remote system 270 and/or premises management device 100 may also communicate data obtained by sensors 110 and/or an indication of movement in the environment to the path light device 200. Although control functions can be provided by any or all of the controller and/or remote system 270 and/or premises management device 100, for clarity, the following discussion is in regard to control of the path light device 200 as provided by the processor 210.

As noted above, implementations of the disclosed subject matter enable automatic system control in which "sleepy" or slow sensor sampling states can be changed to "active" or faster sampling states, or combinations thereof, based on feedback from sensors and other changes in the state of the device to balance user comfort, energy efficiency and proper system function. The implementations are applicable to any number of systems that use one or more sensors where efficient control of the sensor is desirable. Efficient control of the sensor can include any "sleepy" or slow sensor sampling states that can be variably or incrementally changed to "active" or faster sampling states or, can include any "active" or faster sampling states that can be variably or incrementally changed to "sleepy" or slow sensor sampling states, based on feedback from sensors and other changes in the state of the device. Where two or more sensors are included in the system, the sensor control for the two or more sensors can be changed separately or in coordination, or some combination thereof.

For example, the sensor can be variably or incrementally changed from a "fast sampling" rate or period to a "slow sampling" rate or period, including any number of rates or periods there between. The sensor can also be variably or incrementally changed from a "slow sampling" rate or period, including a default rate or period at this level, to a "fast sampling" rate or period, including any number of rates or periods there between. The sensor can also be variably or incrementally changed from a "low resolution" mode, including a default mode at this level, to a "high resolution" mode, including any number of mode level there between. The sensor can also be variably or incrementally changed from a "high resolution" mode to a "low resolution" mode, including any number of mode levels there between. Each change can be in response to changes in the state of the device and derived using, for example a state machine, logic tree, logic mapping, truth table or similar tool.

One implementation of the disclosed subject matter is provided in regard to a path light or area lighting device which, as disclosed herein, may illuminate in response to the detection of motion and/or in response to the detection of a certain level of ambient light in the environment. The implementations of the disclosed subject matter enable path light or area illumination control based on other factors, such as those used to reduce battery power consumption or avoid reliance upon sensor signals that are not applicable for proper device control. Since the path light device 200 is often battery powered, it may be desirable in some cases to take into account how frequently the path light device uses power to sample the sensors, such as the ALS 280, which can consume large amounts of power. At the same time, since the path light device 200 needs to react quickly to certain events, may be desirable in some cases to avoid sampling the sensors too infrequently. Accordingly, it may be desirable for the path light device 200 to operate using multiple sampling modes and/or sampling periods based on detected conditions, and provide transition between each mode and period by balancing user comfort, energy efficiency, sensor position and proper system function.

Implementations of the disclosed subject matter provide a system and method for automatic path light illumination control that can control periods of sensor operation by switching between sampling modes and sampling periods depending upon an analysis of environmental data including ambient light levels, occupancy detection and sensor position and movement. The path light control device 200 determines an optimal sampling mode and sampling period to permit the ALS 280 for example, to accurately measure an ambient light without excessive operation. The accelerometer 284 and compass sensor 286 can be provided to determine device movement and orientation to avoid sensor operation when movement or orientation of the device indicates that the data of the sensor is not applicable for proper device control.

In a typical operation, the path light source 240 turns on when both the path area is dark and motion is detected, and the path light source 240 turns off when the path area is no longer dark or when motion is no longer detected. Implementations of the disclosed subject matter determine sampling modes and sampling periods generally based on accuracy and speed where the path area is dim or dark and motion is detected. Implementations of the disclosed subject matter determine sampling modes and sampling periods generally based on minimizing power consumption where the path area is bright or no motion is detected.

For example, since the ALS 280 consumes a high level of power during operation, the management function of the processor 210 may be configured to consider when to request ALS samples. One competing objective to consider is path light accuracy and response time. If the room or area was bright but suddenly becomes dark, a relatively short delay between detecting the darkness and turning on the path light source 240 may be desirable so as not to give the appearance of a long response time. With no light in this case, the response may be configured to be both fast and accurate, and sampling modes and sampling periods are generally based on accuracy and speed. In addition, in some embodiments the path light source 240 may be configured to turn on only when the room or area is truly dark, not simply dim or where a determination that the area is dark occurred sometime in the past (e.g., a stale determination).

However, if a room or area light is turned on when the path light source 240 is off or already on, there can safely be delay between detecting the brightness and turning off the path light source 240. With alternate light in this case, a response that is not as fast nor as accurate may be acceptable, and sampling modes and sampling periods are generally based on minimizing power consumption.

Another competing objective to consider is ALS power consumption. For purpose of illustration, the ALS 280 can have two sampling modes, including a 100 millisecond (ms) integration time and 800 ms integration time, but embodiments disclosed herein are not limited thereto. In general the power consumption of an ALS 280 also scales linearly with the average sample frequency. In this example, the 800 ms mode uses about 3× the energy per sample of the 100 ms mode since the ALS 280 is activated for a greater duration, but the 800 ms mode provides greater resolution to differentiate between dim conditions, under which it may be desirable for the path light source 240 to remain off, and dark conditions, under which it may be desirable for the path light source 240 to turn on. If the room or area is dark, it may be desirable to prevent error when differentiating between dim and dark conditions, and turning on the path light source 240. With no light in this case, the 800 ms mode provides a response that is accurate. However, if the room or area is bright, there is less need to prevent error when differentiating the bright condition and turning off the path light source 240. With alternate light in this case, the 100 ms mode provides a response that is not as accurate, but which is generally based on minimizing power consumption.

For further purpose of illustration, the ALS 280 can have three sampling periods, including a 90 second interval, a 5 second interval, and a 1 second interval, but embodiments disclosed herein are not limited thereto. In this example, the 5 second interval uses more energy than the 90 second interval, and the 1 second interval uses more energy than the 5 second interval, since the ALS 280 is activated more often. However, the 1 second and 5 second sampling periods provide faster response during occupancy of the path area, when it may be desirable for the path light source 240 to turn on, or during lack of occupancy, when it may be desirable for the path light source 240 to remain off. If there is occupancy motion detected, it may be desirable to prevent excessive delay when detecting dim and dark conditions and turning on the path light source 240. With occupancy motion in this case, the 5 second interval and 1 second interval provide a response that is fast. However, if there is no occupancy motion detected, there can safely be delay when detecting the bright condition and turning off the path light source 240. With no occupancy motion in this case, the 90 second interval provides a response that is not as fast, but which is generally based on minimizing power consumption.

Still another competing objective to consider is path light source 240 power consumption. In some cases, the power consumed by driving the path light can be 1000× the power consumed by sampling the ALS 280, so it can be possible to save more power if a faster sampling period allows detection of room lights turning on sooner and reduce unnecessary usage of the path light. The 5 second interval and 1 second interval provide faster detection of room lights turning on, when it may be desirable for the path light source 240 to quickly turn off. The 5 second interval and 1 second interval provide a response that is fast and, in this case, is also generally based on minimizing power consumption.

Figure 3:
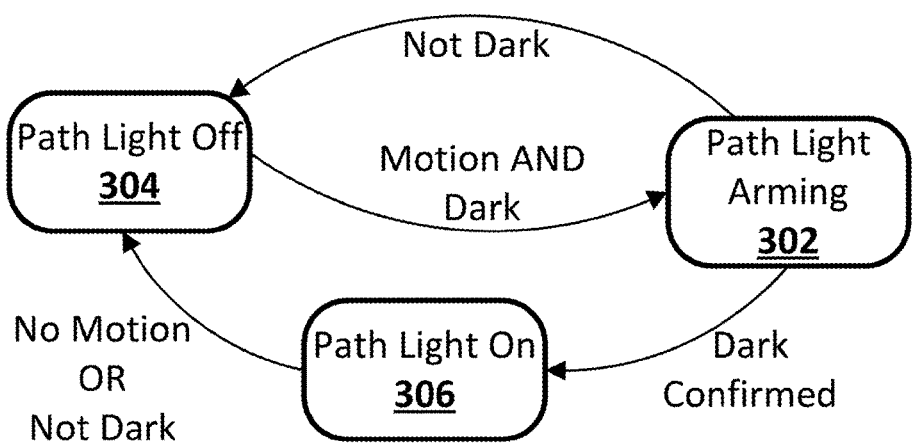
FIG. 3 shows an illustrative path light function executed by the processor according to an implementation of the disclosed subject matter.
Figure 4:
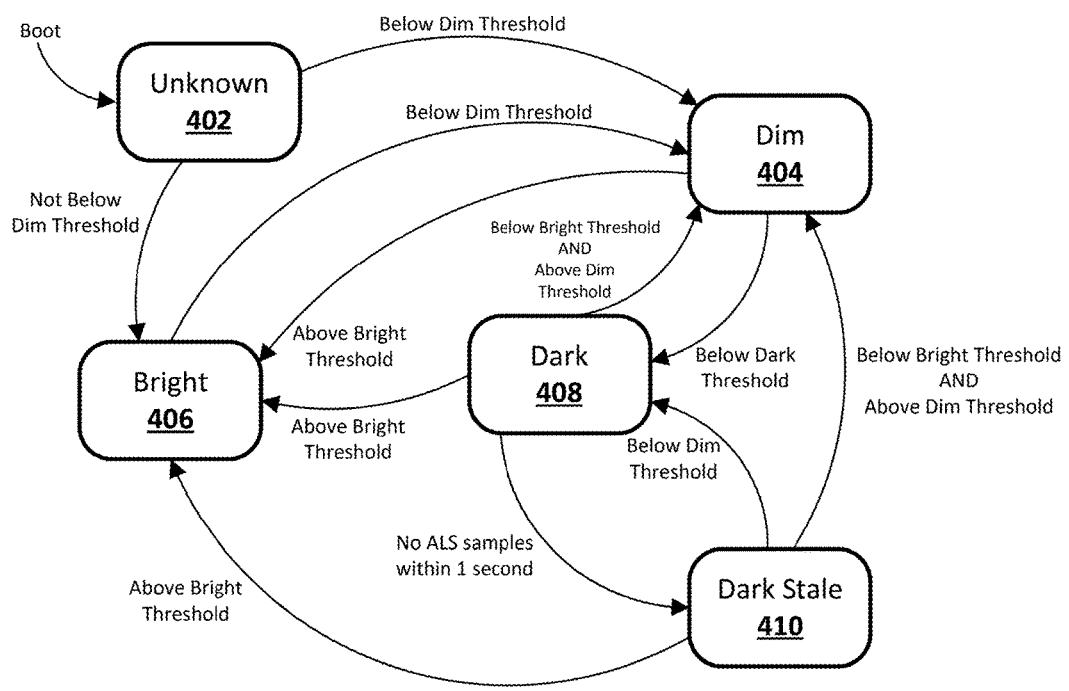
FIG. 4 shows an illustrative environmental state function executed by the processor according to an implementation of the disclosed subject matter.
Figure 5:
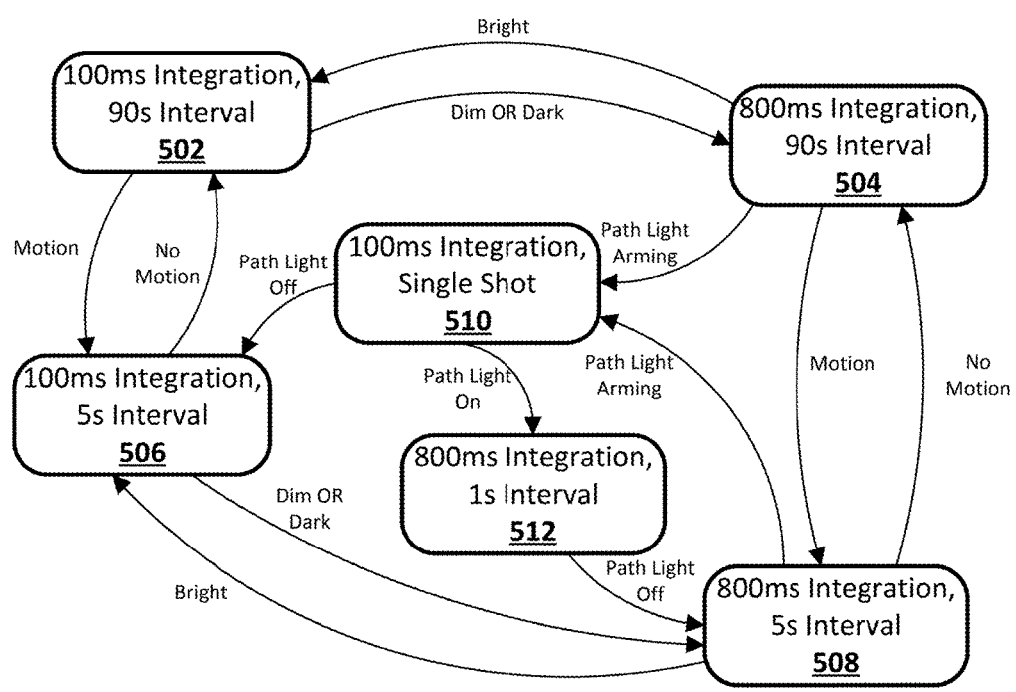
FIG. 5 shows an illustrative ALS sampling function executed by the processor according to an implementation of the disclosed subject matter.

FIG. 3 shows an illustrative path light function executed by the processor 210 according to an implementation of the disclosed subject matter. In order to meet the path light performance objectives while not exceeding the a power budget, in one example the ALS sampling mode and sampling period may be determined dynamically as illustrated in FIGS. 4 and 5. In the following descriptions, an environmental state or condition is considered "Not Dark" when the Dark detector state is not "Dark" or not "Dark Stale". It is considered "Dark" when the Dark detector state is "Dark" or "Dark Stale", and it is considered "Dark Confirmed" when the Dark detector state is "Dark". "Motion" is considered identified when motion is detected within a set threshold period, such as the past 3 seconds, and no motion is considered identified when motion is not detected within the threshold period.

In an implementation of the disclosed subject matter, the processor 210 can determine an environmental state or condition in accordance with a pre-determined state machine. The state machine may be encoded into the processor (e.g. as software, firmware or hardware), and can define multiple illumination states, as well as events which trigger transitions between the illumination states. The use of such a state machine allows the processor 210 to program or adjust the plurality of illumination states and the plurality of events defining the transitions between the illumination states. In other implementations of the disclosed subject matter, the processor 210 can determine an environmental state or condition in accordance with a truth table, logic mapping or similar tool. The use of such a truth table, logic mapping or similar tool also allows the processor 210 to program or adjust the illumination conditions and the plurality of events defining the transitions between the illumination conditions.

As shown in FIG. 3, whenever the path light device 200 is on and "Motion" is detected while it is "Dark", the path light device 200 can transition to an arming state 302. In the arming state 302, one extra ALS sample is scheduled immediately if the Dark state is stale (i.e. the previous ALS sample was taken more than 1 second ago). This helps reduce false positives that could occur if a room light turned on in the interval between the last ALS sample and motion being detected. If it is not "Dark", the path light device 200 can transition from the arming state 302 to a path light off state 304. If it is "Dark", the path light device 200 can transition from the arming state 302 to a path light on state 306. Subsequently, if no "Motion" or "Dark" condition is detected, the path light device 200 can transition from the path light on state 306 to the path light off state at 304. However, in the operation of FIG. 3, implementations of the disclosed subject matter further dynamically determine the ALS sampling mode and sampling period to satisfy path light performance objectives while not exceeding an a power budget. To do so, the processor 210 determines an environmental state as illustrated in FIG. 4, and drives an ALS sampling function based on the determined environmental state as illustrated in FIG. 5.

FIG. 4 shows an illustrative environmental state function executed by the processor 210 according to an implementation of the disclosed subject matter. The purpose of the environmental state function is to provide inputs to the ALS Sampling function of FIG. 5. FIG. 5 shows an illustrative ALS sampling function executed by the processor 210 according to an implementation of the disclosed subject matter. Although in the example the path light will only turn on when in the Dark state, a Dim state is included to provide hysteresis to the ALS Sampling function of FIG. 5. The Dark Stale state is also provided to inform the ALS Sampling function of how recently the ALS received a dark reading.

As noted above, an environmental state or condition is considered "Not Dark" when the Dark detector state is not "Dark" or not "Dark Stale". It is considered "Dark" when the Dark detector state is "Dark" or "Dark Stale" and it is considered "Dark Confirmed" when the Dark detector state is "Dark". "Motion" is considered identified when motion is detected within the past 3 seconds, and no motion is considered identified when motion is not detected within the past 3 seconds. As shown in FIG. 4, at boot or power up, the path light device 200 can transition to an unknown state 402. An ALS sample is taken, and if the ambient light is below a dim threshold, the path light device 200 can transition to a Dim state 404. If the ambient light is not below the dim threshold, the path light device 200 can transition to a Bright state 406. In the following, the ALS samples may be taken at one of 90 second, 5 second, and 1 second intervals or sampling periods, as described in regard to FIG. 5.

While in the Bright state 406, an ALS sample is taken, and if the ambient light is below the dim threshold, the path light device 200 can transition to the Dim state 404. While in the Dim state 404, an ALS sample is taken, and if the ambient light is above the bright threshold, the path light device 200 can transition to the Bright state 406. If the ambient light is below a dark threshold, the path light device 200 can transition to a Dark state 408.

While in the Dark state 408, an ALS sample is taken, and if the ambient light is above the bright threshold, the path light device 200 can transition to the Bright state 406. If the ambient light is below the bright threshold and above the dim threshold, the path light device 200 can transition to the Dim state 404. If no ALS samples have been taken within 1 second, the path light device 200 can transition to the Dark Stale state 410.

While in the Dark Stale state 410, an ALS sample is taken, and if the ambient light is above the bright threshold, the path light device 200 can transition to the Bright state 406. If the ambient light is below the bright threshold and above the dim threshold, the path light device 200 can transition to the Dim state 404. If the ambient light is below a dim threshold, the path light device 200 can transition to the Dark state 408.

As illustrated in FIG. 5, the ALS 280 in this case has two sampling modes for illustration purposes, including a 100 ms integration time and 800 ms integration time, but implementations disclosed herein are not limited thereto. The 800 ms mode uses about 3× the energy per sample of the 100 ms mode since the ALS 280 is activated for a greater duration, but the 800 ms mode has the resolution required to differentiate between Dim conditions, under which the path light source 240 should not turn on, and Dark conditions, under which the path light source 240 should turn on. The ALS 280 also has three sampling periods, including a 90 second interval, a 5 second interval, and a 1 second interval, but implementations disclosed herein are not limited thereto. The 5 second interval uses more energy than the 90 second interval, and the 1 second interval uses more energy than the 5 second interval, since the ALS 280 is activated more often. However, the 1 second and 5 second sampling periods provide faster response that can be needed during occupancy of the path area, when the path light source 240 should turn on.

By default, the ALS 280 can be sampled every 90 seconds in the 100 ms integration mode 502 for maximum energy efficiency. The sampling period can be decreased from 90 seconds to 5 seconds at 506 whenever motion is detected at 502 allowing additional operation of the ALS 280 to improve response time during occupancy, giving priority to response time due to occupancy over energy efficiency.

The mode can switch to the 800 ms mode 504, 508, respectively, whenever it is Dim or Dark at 502, 506, as determined in FIG. 4, allowing additional operation of the ALS 280 to differentiate between Dim and Dark states, giving priority to accuracy due to darkness over energy efficiency. The sampling period can be decreased from 90 seconds to 5 seconds at 508 whenever motion is detected at 504 allowing additional operation of the ALS 280 to improve response time during occupancy, giving priority to response time due to occupancy over energy efficiency. As noted above, motion is considered identified when motion is detected by the PIR 282 within the past 3 seconds, and no motion is considered identified when motion is not detected by the PIR 282 within the past 3 seconds. If no motion is detected, the path light device 200 returns to 502, 504, respectively, where the ALS 280 can be sampled again every 90 seconds for energy efficiency.

If a Dark state, as defined in FIG. 4, is detected at either mode 504 or 508, path light arming occurs in a 100 ms mode at 510. In the arming state, at least one extra ALS sample, a single shot, is scheduled immediately if the Dark state is stale (i.e. the previous ALS sample was taken more than 1 second ago). This helps reduce false positives that could occur if a room light turned on in the interval between the last ALS sample and motion being detected. If the extra ALS sample indicates that it is not Dark, the path light device 200 transitions to a path light off state and the sampling period can be set to 5 seconds in a 100 ms mode at 506 and can then be set to 90 seconds in a 100 ms mode at 502 if no motion is detected, for maximum energy efficiency.

If the extra ALS sample at 510 indicates that it is Dark, the path light device 200 transitions to a path light on state at 512 and the ALS sampling period can be set to 1 second in an 800 ms mode to allow for quick reactions to a room light turning on while the path light LED is on and in such a case, transitions to a path light off state and returns to 508. In this case, the path light device 200 provides a more consistent user experience of having less variation in fading out the pathlight when for example, room lights are turned on. Further, in this case, it is assumed that the power consumed by driving the path light can be 1000× the power consumed by sampling the ALS 280 in this mode, so it can be possible to save more power if the faster sampling period allows detection of room lights turning on sooner and reduce unnecessary usage of the path light.

Reliance upon poor quality sensor signals can be another source of undesired power consumption. For example, when the premises management device 100 or path light device 200 is mounted to a door, window, gate or other moveable surface, the PIR sensor of the device may detect motion as the device including the PIR sensor moves. This can result in unwanted activation of the path light feature thereby wasting power. Further, spurious occupancy events, for example in the case where a door is opened but the room the device monitors is not actually entered can result in unwanted activation of the path light feature. Also, when the premises management device 100 or path light device 200 is mounted to a door, window, gate or other moveable surface which has been opened but now stationary, the PIR sensor's field of view may be changed and redirected in such a manner that the PIR sensor can no longer see things in the room or area of interest. In some cases the PIR sensor may then see things in another room or area, or see nothing at all.

Implementations of the disclosed subject matter can determine whether the PIR sensor itself is moving by monitoring the accelerometer and/or compass sensors. If the PIR sensor itself is determined to be moving, the device can assume that any PIR activity is due to the PIR sensor moving, rather than something or someone in the room moving. In this case, the processor can temporarily disable or suspend the PIR sensor sampling and/or disable control functions based on the PIR sensor, thus avoiding triggering any PIR motion-dependent features, including but limited to path light control and occupancy detection. Although these control functions can be provided by any or all of the controller and/or remote system 270 and/or premises management device 100, for clarity, the following discussion is in regard to control of the path light device 200 as provided by the processor 210.

In an implementation of the disclosed subject matter, the accelerometer 284 and compass sensor 286 can determine path light device 200 movement and orientation to avoid PIR sensor 282 operation when the movement or orientation of the path light device 200 indicates that the data of the PIR sensor 282 is no longer applicable for proper device control. For example, the PIR sensor 282 can typically gauge if there is motion in the vicinity by detecting an image motion and/or a signature of the image motion in a field of view. To do so, the PIR 282 has a particular field of view and depending on where the detected object is located in the field of view, different signal patterns are generated. The PIR sensor 282 can detect motion in terms of signal amplitude and signal shape, and based thereon, the processor 210 can determine how far away and in what direction the motion is occurring and dynamically control path light illumination.

For purposes of illustration, the path light device 200 includes the ALS 280, PIR sensor 282, accelerometer 284 and compass sensor 286 or combination thereof, within a single housing, such that the sensor information indicates conditions that are common to all of the path light device 200, ALS 280, PIR sensor 282, accelerometer 284 and compass sensor 286. For example, in this case motion detected by the accelerometer 284, indicates motion of the path light device 200, ALS 280, PIR sensor 282, accelerometer 284 and compass sensor 286. Further, directional orientation detected by the compass sensor 286, indicates directional orientation of the path light device 200, ALS 280, PIR sensor 282, accelerometer 284 and compass sensor 286, and so forth.

Accordingly, implementations of the disclosed subject matter can determine whether the path light device 200 itself is moving by monitoring the accelerometer 284 and/or compass sensor 286. An illustrative accelerometer 284 includes improved features with respect to detection, distinction and communication of data regarding movements within an environment of the path light device 200, and an illustrative compass sensor 286 includes improved features with respect to detection, distinction and communication of data regarding orientation and direction of the path light device 200. Other sensors that allow measurement of motion, position and orientation, such as gyro meters, inclinometers, or Bluetooth low-energy location sensing, could be used instead of the accelerometer and compass.

Figure 7:
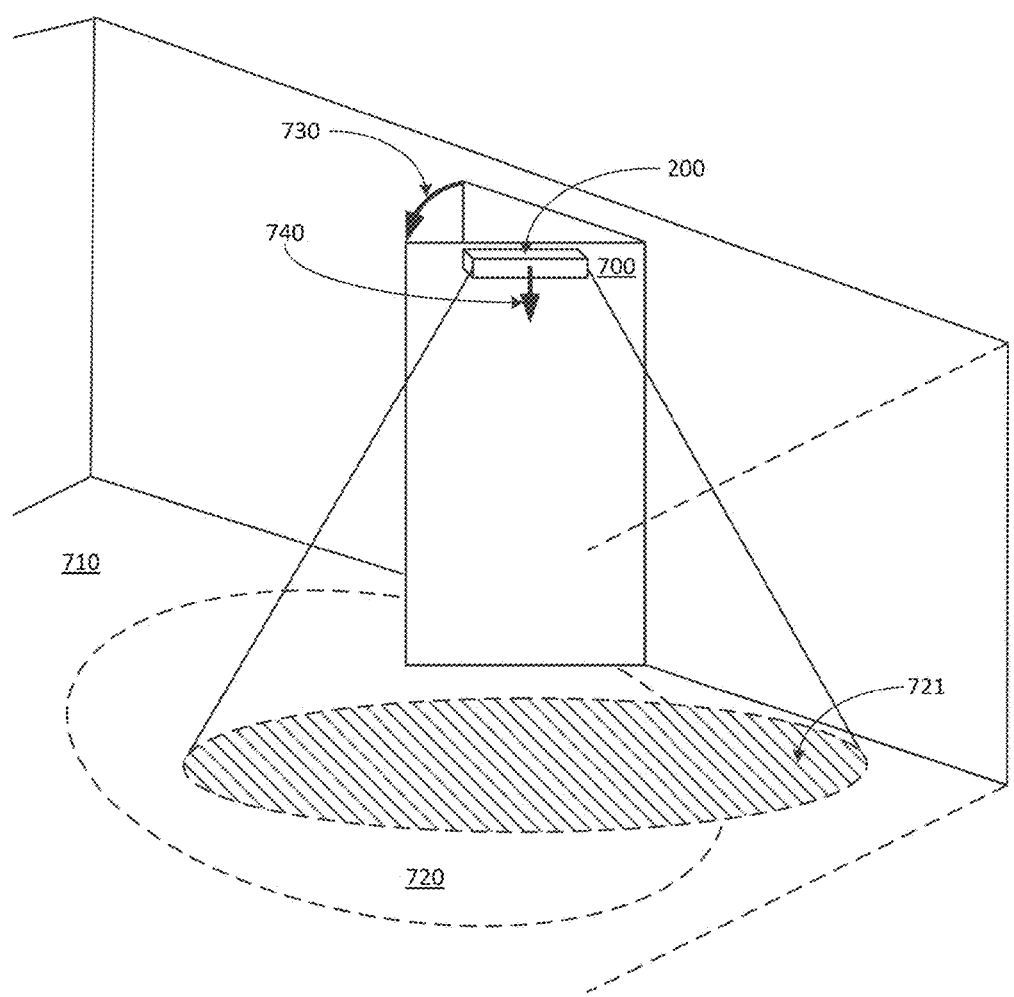
FIG. 7 shows an illustrative path light device in a room according to an embodiment of the disclosed subject matter.

The processor 210 can monitor data of the accelerometer 284 and compass sensor 286 and detect motion of the path light device 200, including the PIR sensor 282. Such motion may be caused by the movement of a door, window, gate or other moveable surface on which the path light device 200 is mounted. For example, FIG. 7 shows an illustrative path light device 200 mounted to door 700 in room 710 after movement 730 of door 700 results in a direction of orientation 740. If the PIR sensor 282 itself is determined to be moving, such as is shown at 730, the processor 210 determines that any PIR sensor 282 activity is due to the PIR sensor 282 moving, rather than something or someone in the room moving. In this case, the processor 210 can temporarily disable or suspend the PIR sensor sampling and disable control functions based on the PIR sensor 282, thus avoiding triggering any PIR motion-dependent features, including but not limited to path light control and occupancy detection. Accordingly, implementations of the disclosed subject matter reduce false positives of PIR motion events, save power and reduce the confusion of false occupancy reports. Such implementations of the disclosed subject matter also serve to notify the user that a room may be less secure because the PIR motion detector is or was momentarily not available due to detected device motion.

The compass sensor 286 is also used to determine whether the PIR sensor's field of view may be changed and redirected in such a manner that the PIR sensor can no longer see things in the room or area of interest. As noted above, when the path light device 200 is mounted to a door, window, gate or other moveable surface which has been opened but stationary, the PIR sensor's field of view may be changed and redirected. For example, as shown in FIG. 7, a field of view of path light device 200 may include area 720, but when door 700 opens, the field of view may include area 721. The PIR 282 has a particular field of view and depending on where the detected object is located in the field of view, different signal patterns are generated. In some cases, while the door, window, gate or other moveable surface on which the path light device 200 is mounted is open, the PIR sensor 282 may be facing in a direction that provides a worse view of the area or even no view of the area at all.

The processor 210 can monitor data of the compass sensor 286 and detect orientation and direction of the path light device 200, including the PIR sensor 282. If the orientation and direction of the path light device 200, including the PIR sensor 282, is determined to be in an orientation that is inoperative for PIR motion sensing, the processor 210 can temporarily disable or suspend the PIR sensor sampling and disable control functions based on the PIR sensor, thus avoiding triggering any PIR motion-dependent features, including but not limited to path light control and occupancy detection. Such implementations of the disclosed subject matter also serve to notify the user that a room may be less secure because the PIR motion detector is temporarily disabled while the door, window, gate or other moveable surface on which the path light device 200 is mounted is open. Further, even for installation on stationary objects, the path light device 200 can use the compass sensor 286 to determine orientation and assess whether the PIR field of view is oriented in a way that is suitable for PIR motion detection, pet rejection, and so forth, and notify a user of the determination results.

Although the implementations of the disclosed subject matter disregard some sensor operations when the device is moving or when the device is no longer correctly oriented, other implementations of the disclosed subject matter attempt to continue operation. Specifically, other implementations of the disclosed subject matter provide procedures that instruct the user to go through a PIR motion test mode, both when the door, window, gate or other moveable surface on which the path light device 200 is mounted is fully closed, and when fully open. The procedure is configured to learn whether the open configuration is suitable for PIR motion detection and adjust sensitivity, thresholds and messages based on position and orientation to continue operation of the previously excluded sensors. Normal operation can return upon reorientation to the original position.

The above implementations of the disclosed subject matter are shown in use with an ALS, PIR and compass sensor. However, the same implementations of the disclosed subject matter can be equally applied to any system or method that includes a sensor or combination of sensors where orientation or movement can be a factor in operation, and where there is a default "sleepy" or slow sensor sampling state that can be changed to an "active" or faster sampling state based on feedback from sensors and other changes in state in the device. Although other devices may lack enough sensors to provide sufficient context to allow such dynamic changes to sensor sampling modes and/or sampling periods, the approach of implementations of the disclosed subject matter is flexible and can be customized for the specific needs of any combination of sensors. Further, rather than relying on discrete states to determine the sensor sampling mode, the sampling mode can be determined from an equation or simple logical mapping from comparing another sensor's reading to a threshold. The environmental state or condition can be determined in accordance with a truth table, logic mapping or similar tool, which allows the processor to program or adjust the plurality of illumination conditions and the plurality of events defining the transitions between the plurality of illumination conditions. Any number of other battery-powered devices with one or more power-consuming sensors can use such implementations of the disclosed subject matter, including smartphones, tablets and other smart home sensors.

The path light devices as disclosed herein may operate independently or may operate within a communication network, such as a conventional wireless network and/or a sensor-specific network through which sensors may communicate with one another and/or with dedicated other devices. In some configurations one or more sensors may provide information to one or more other sensors, to a central controller, or to any other device capable of communicating on a network with the one or more sensors. In such a case, a central controller can be provided, including one or more of a general-purpose or special-purpose central controller. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, the central controller as disclosed herein may be remote from the sensors, such as where the central controller is implemented as a cloud-based system that communicates with multiple sensors, which may be located at multiple locations and may be local or remote with respect to one another.

In each case, the device can use encryption processes to ensure privacy, anonymity and security of data. Data stored in the device's memory as well as data transmitted to other devices can be encrypted or otherwise secured. Additionally, the user can set the device profile for data purging, local processing only (versus cloud processing) and to otherwise limit the amount and kind of information that is measured, stored and shared with other devices. The user can also be provided with an opt-in mechanism by which they can voluntarily set the amount and type of information that is measured, stored and communicated. Users may also opt-out of such a system at any time.

Figure 6:
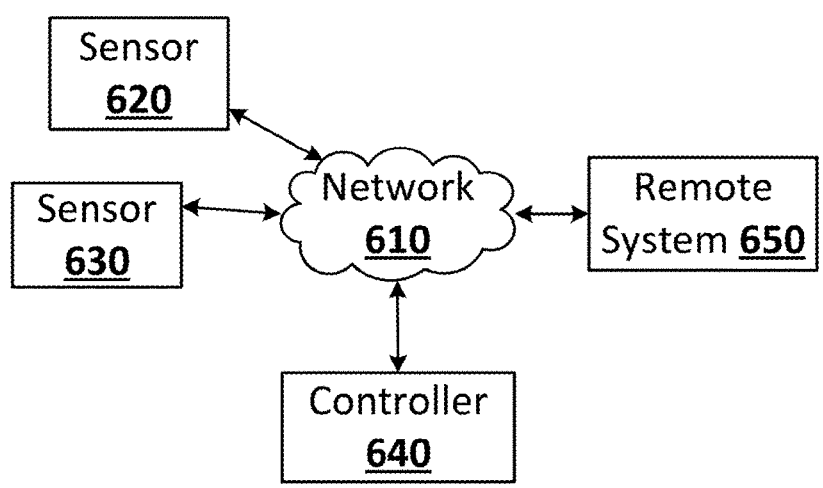
FIG. 6 shows an illustrative device network as disclosed herein, which may be implemented over any suitable wired and/or wireless communication network.

FIG. 6 shows an example of a sensor network as disclosed herein, which may be implemented over any suitable wired and/or wireless communication networks. The sensor network can include a common local network 610, sensors 620, 630, and so forth, a controller 640 and a remote system 650, but embodiments disclosed herein are not limited thereto. One or more sensors 620, 630 may communicate via the local network 610, such as a Wi-Fi™ or other suitable network, with each other and/or with the controller 640. The controller 640 may be a general-purpose or special-purpose computer or similar device, which can, for example, receive, aggregate, and/or analyze environmental information received from the sensors 620, 630. The sensors 620, 630 and the controller 640 may be located locally to one another, such as within a single dwelling, office space, building, room, or the like, or they may be remote from each other, such as where the controller 640 is implemented in a remote system 650 such as a cloud-based reporting and/or analysis system. Alternatively or in addition, the sensors may communicate directly with the remote system 650, and the remote system 650 may, for example, aggregate data from multiple locations, provide instructions, software updates and/or aggregated data, to the controller 640 and/or sensors 620, 630.

The sensor network shown in FIG. 6 may be an example of a smart-home environment which may include a structure, a house, office building, garage, mobile home, or the like. The devices of the smart home environment, such as the sensors 620, 630, the controller 640 and the network 610 may also be integrated into a smart-home environment that does not include an entire structure, such as an apartment, condominium, or office space.

The smart home environment can control and/or be coupled to devices outside of the structure. For example, one or more of the sensors 620, 630 may be located outside the structure, for example, at one or more distances from the structure, at points along a land perimeter on which the structure is located, and the like. Further, one or more of the devices in the smart home environment need not physically be within the structure. For example, the controller 640 which may receive input from the sensors 620, 630 may be located outside of the structure.

The structure of the smart-home environment may include a plurality of rooms, separated at least partly from each other via walls, floors and ceilings, where the walls can include interior walls or exterior walls. Accordingly, when disposed in such environments, devices of the smart-home environment such as the sensors 620, 630, may be mounted on, integrated with and/or supported by the walls, floors and/or ceilings of the structure.

The smart-home environment including the sensor network shown in FIG. 6 may include a plurality of devices, including intelligent, multi-sensing, network-connected devices that can integrate seamlessly with each other and/or with a central server or a cloud-computing system to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells").

The smart-home environment of the sensor network shown in FIG. 6 may also include one or more intelligent, multi-sensing, network-connected wall switches (e.g., "smart wall switches") and one or more intelligent, multi-sensing, network-connected wall plug interfaces (e.g., "smart wall plugs"). A smart wall switch may detect ambient lighting conditions, and control a power and/or dim state of one or more lights. For example, a sensor such as sensors 620, 630, may detect ambient lighting conditions, and a device such as the controller 640 may control the power to one or more lights (not shown) in the smart-home environment. Smart wall switches may also control a power state or speed of a fan, such as a ceiling fan. For example, sensors 620, 630 may detect the power and/or speed of a fan, and the controller 640 may adjust the power and/or speed of the fan, accordingly. Smart wall plugs may control supply of power to one or more wall plugs (e.g., such that power is not supplied to the plug if nobody is detected to be within the smart-home environment). For example, one of the smart wall plugs may control supply of power to a lamp (not shown).

In implementations of the disclosed subject matter, a smart-home environment may also include one or more intelligent, multi-sensing, network-connected entry detectors (e.g., "smart entry detectors"). The illustrated smart entry detectors may be disposed at one or more windows, doors, and other entry points of the smart-home environment for detecting when a window, door, or other entry point is opened, broken, breached, and/or compromised. The smart entry detectors may generate a corresponding signal to be provided to the controller 640 and/or the remote system 650 when a window or door is opened, closed, breached, and/or compromised. In some implementations of the disclosed subject matter, the alarm system, which may be included with controller 640 and/or coupled to the network 610 may not arm unless all smart entry detectors (e.g., sensors 620, 630) indicate that all doors, windows, entryways, and the like are closed and/or that all smart entry detectors are armed.

In further implementations of the disclosed subject matter, a smart-home environment may also include one or more intelligent, multi-sensing, network-connected intruder detectors. The illustrated intruder detectors (e.g., sensors 620, 630) may be disposed at one or more points of the smart-home environment for detecting and distinguishing an intruder. The intruder detectors may generate a corresponding signal to be provided to the controller 640 and/or the remote system 650 when an intruder is detected and distinguished. In some implementations of the disclosed subject matter, the alarm system can provide at least two modes of pet immunity operation. Where no pets are expected to be present within a detection range of the sensors, the user can operate the system without a pet immune operation mode. Where pets are expected to be present within a detection range of the sensor, the user can operate the same system to implement a pet immune operation mode.

In these and other implementations of the disclosed subject matter, a user can interact with one or more of the network-connected smart devices (e.g., via the network 610) for a number of purposes. For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view a status, and can arm or disarm the security system of the home.

Additional users can also be permitted to control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 640). Such registration can be made at a central server (e.g., the controller 640 and/or the remote system 650) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Finally, the smart-home environment may include communication with devices outside of the smart-home environment but within a proximate geographical range of the home. For example, the smart-home environment may include an outdoor lighting system (not shown) that communicates information through the communication network 610 or directly to a central server or cloud-computing system (e.g., controller 640 and/or remote system 650) regarding detected movement and/or presence of people, animals, and any other objects and receives back commands for controlling the lighting accordingly.

Various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing implementations of the disclosed subject matter. When implemented on a general-purpose microprocessor, the computer program code may configure the microprocessor to become a special-purpose device, such as by creation of specific logic circuits as specified by the instructions.

The disclosed subject matter may also be implemented using hardware that may include a processor, such as a general purpose microprocessor and/or an Application Specific Integrated Circuit (ASIC) that embodies all or part of the techniques according to the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to the disclosed subject matter.

The foregoing description, for purpose of explanation, has been described with reference to specific implementations. However, the illustrative discussions above are not intended to be exhaustive or to limit the disclosed subject matter to the precise forms disclosed. Many modifications and variations are possible in view of the above teachings. The implementations were chosen and described in order to explain the principles of the disclosed subject matter and their practical applications, to thereby enable others skilled in the art to utilize those implementations as well as various implementations with various modifications as may be suited to the particular use contemplated.

The invention claimed is:

1. A device for control of path light illumination and motion detection systems, comprising:
    an ambient light sensor configured to detect an ambient light level in a first area monitored by the device;
    a path light source; and
    a processor communicatively coupled to the ambient light sensor and the path light source, the processor configured to:
        determine an ambient light sensor sampling mode based on the ambient light level, the ambient light sensor sampling mode comprising a sampling integration time,
        determine an ambient light sensor sampling period based on the ambient light level and detected motion in a second area monitored by the device, and
        control the path light source based on sensor data obtained at the ambient light sensor sampling mode and the ambient light sensor sampling period.

2. The device of claim 1, further comprising at least one sensor selected from the group consisting of: a passive infrared sensor to detect motion in an area monitored by the device, an accelerometer to detect motion of the device, and a compass sensor to detect motion of the device and directional orientation of the device.

3. The device of claim 2, wherein the processor is configured to determine a passive infrared sensor sampling mode based on a detected motion of the device,
    the passive infrared sensor sampling mode being disabled when motion of the device is detected, and
    the passive infrared sensor sampling mode being enabled when no motion of the device is detected.

4. The device of claim 3, further comprising a communication interface, wherein the processor is configured to control the communication interface to notify a user that the passive infrared sensor sampling mode is disabled due to the detected motion of the device.

5. The device of claim 2, wherein the processor is configured to determine a passive infrared sensor sampling mode based on a detected directional orientation of the device,
    the passive infrared sensor sampling mode being disabled when an inoperative directional orientation of the device is detected, and
    the passive infrared sensor sampling mode being enabled when an inoperative directional orientation of the device is not detected.

6. The device of claim 5, further comprising a communication interface, wherein the processor is configured to control the communication interface to notify a user that the passive infrared sensor sampling mode is disabled due to a detected inoperative directional orientation of the device.

7. The device of claim 1 wherein:
the ambient light sensor sampling mode comprises a first integration time when the ambient light level in the first area is greater than a threshold value, and
the ambient light sensor sampling mode comprises a second integration time when the ambient light level in the first area is not greater than the threshold value, wherein the first integration time is less than the second integration time.

8. The device of claim 1 wherein:
the ambient light sensor sampling period comprises a first interval when motion in the second area is detected within a threshold time period, and
the ambient light sensor sampling period comprises a second interval when motion in the second area is not detected within the threshold time period, wherein the first interval is less than the second interval.

9. The device of claim 1, wherein the second area monitored by the device comprises a path area illuminated by the path light source.

10. A device for control of path light illumination and motion detection systems, comprising:
an ambient light sensor configured to detect an ambient light level in a first area monitored by the device; and
a processor configured to:
determine, for the ambient light sensor, a sensor sampling mode based on the ambient light level, the sensor sampling mode comprising a sampling integration time,
determine, for the ambient light sensor, a sensor sampling period based on the ambient light level and detected motion in a second area monitored by the device,
control the ambient light sensor using the sensor sampling mode and the sensor sampling period, and
control at least one path light source based on sensor data obtained at the sensor sampling mode and the sensor sampling period.

11. The device of claim 10, further comprising at least one sensor selected from the group consisting of: a passive infrared sensor to detect motion in an area monitored by the device, an accelerometer to detect motion of the device, and a compass sensor to detect motion of the device and directional orientation of the device.

12. The device of claim 11, wherein the processor is configured to determine a passive infrared sensor sampling mode based on a detected motion of the device,
the passive infrared sensor sampling mode being disabled when motion of the device is detected, and
the passive infrared sensor sampling mode being enabled where no motion of the device is detected.

13. The device of claim 12, further comprising a communication interface, wherein the processor is configured to control the communication interface to notify a user that the passive infrared sensor sampling mode is disabled due to the detected motion of the device.

14. The device of claim 11, wherein the processor is configured to determine a passive infrared sensor sampling mode based on a detected directional orientation of the device,
the passive infrared sensor sampling mode being disabled when an inoperative directional orientation of the device is detected, and
the passive infrared sensor sampling mode being enabled when an inoperative directional orientation of the device is not detected.

15. The device of claim 14, further comprising a communication interface, wherein the processor is configured to control the communication interface to notify a user that the passive infrared sensor sampling mode is disabled due to a detected inoperative directional orientation of the device.

16. The device of claim 10, wherein:
the sensor sampling mode comprises a first integration time when the ambient light level in the first area is greater than a threshold value, and
the sensor sampling mode comprises a second integration time when the ambient light level in the first area is not greater than the threshold value, wherein the first integration time is less than the second integration time.

17. The device of claim 10, wherein:
the sensor sampling period comprises a first interval when motion in the first area is detected within a threshold time period, and
the sensor sampling period comprises a second interval when motion in the first area is not detected within the threshold time period, wherein the first interval is less than the second interval.

18. A method for control of path light illumination and motion detection systems, comprising:
detecting, by a sensor comprising an ambient light sensor, an ambient light level in a first area monitored by a device comprising the sensor;
determining, for the ambient light sensor, a sensor sampling mode based on the ambient light level, the sensor sampling mode comprising a sampling integration time;
determining, for the ambient light sensor, a sensor sampling period based on the ambient light level and detected motion in a second area monitored by the device; and
controlling a path light source based on sensor data obtained at the sensor sampling mode and the sensor sampling period.

19. The method of claim 18, wherein the sensor comprises at least one selector selected from the group consisting of: a passive infrared sensor to detect motion in an area monitored by the device, an accelerometer to detect motion of the device, and a compass sensor to detect motion of the device and directional orientation of the device.

20. The method of claim 19, further comprising:
determining a passive infrared sensor sampling mode based on a detected motion of the device,
the passive infrared sensor sampling mode being disabled when motion of the device is detected, and
the passive infrared sensor sampling mode being enabled when no motion of the device is detected.

21. The method of claim 20, further comprising notifying a user that the passive infrared sensor sampling mode is disabled due to the detected motion of the device.

22. The method of claim 19, further comprising:
determining a passive infrared sensor sampling mode based on detected directional orientation of the device,
the passive infrared sensor sampling mode being disabled when an inoperative directional orientation of the device is detected, and the passive infrared sensor sampling mode being enabled when an inoperative directional orientation of the device is not detected.

23. The method of claim 22, further comprising notifying a user that the passive infrared sensor sampling mode is disabled due to a detected inoperative directional orientation of the device.

24. The method of claim 18, wherein:

the sensor sampling mode comprises a first integration time when the ambient light level in the first area is greater than a threshold value, and the sensor sampling mode comprises a second integration time when the ambient light level in the first area is not greater than the threshold value, wherein the first integration time is less than the second integration time.

25. The method of claim 18, wherein:

the sensor sampling period comprises a first interval when motion in the first area is detected within a threshold time period, and the sensor sampling period comprises a second interval when motion in the first area is not detected within the threshold time period, wherein the first interval is less than the second interval.

* * * * *